United States Patent
Ożóg et al.

(10) Patent No.: US 12,366,178 B1
(45) Date of Patent: Jul. 22, 2025

(54) FLEXIBLE SUPPORT FOR AIRCRAFT MOTOR BEARING

(71) Applicant: Pratt & Whitney Canada Corp., Longueuil (CA)

(72) Inventors: Mateusz Ożóg, Hucisko (PL); Amir Masoud Tahvilian, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/420,095

(22) Filed: Jan. 23, 2024

(51) Int. Cl.
*F01D 25/16* (2006.01)

(52) U.S. Cl.
CPC ........ *F01D 25/164* (2013.01); *F05D 2240/50* (2013.01)

(58) Field of Classification Search
CPC ...... F01D 25/16; F01D 25/162; F01D 25/164; F16C 27/04
See application file for complete search history.

(56) References Cited

U.S. PATENT DOCUMENTS

| | | | | |
|---|---|---|---|---|
| 3,512,856 A | * | 5/1970 | Robinson | F16C 33/6651 |
| | | | | 384/535 |
| 3,549,220 A | * | 12/1970 | Robinson | F16C 25/06 |
| | | | | 384/535 |
| 3,640,591 A | * | 2/1972 | Eklund | F16C 19/163 |
| | | | | 384/535 |
| 3,709,570 A | * | 1/1973 | Galbato | F16C 27/04 |
| | | | | 384/536 |
| 4,429,923 A | * | 2/1984 | White | F16C 27/045 |
| | | | | 384/99 |
| 4,496,252 A | | 1/1985 | Horler | |
| 4,952,076 A | | 8/1990 | Wiley, III | |
| 5,112,143 A | * | 5/1992 | Ide | F16F 15/0237 |
| | | | | 384/107 |
| 5,455,778 A | * | 10/1995 | Ide | F16J 15/3432 |
| | | | | 700/182 |
| 8,337,090 B2 | | 12/2012 | Herborth | |
| 9,926,975 B2 | | 3/2018 | Smedresman | |
| 10,450,893 B1 | | 10/2019 | Polly | |
| 10,753,391 B1 | * | 8/2020 | Smedresman | F16F 15/0237 |
| 11,021,998 B2 | | 6/2021 | Ganiger | |
| 11,105,223 B2 | | 8/2021 | Ganiger | |
| 11,193,390 B2 | | 12/2021 | Ganiger | |
| 11,674,397 B2 | | 6/2023 | Ganiger | |

(Continued)

*Primary Examiner* — Topaz L. Elliott
(74) *Attorney, Agent, or Firm* — Getz BalichLLC (57) ABSTRACT

An assembly is provided for an aircraft motor. The assembly includes a bearing, a stationary structure and a flexible support. The bearing extends circumferentially around an axis. The stationary structure circumscribes the bearing. The flexible support is arranged radially between the bearing and the stationary structure. The flexible support includes an inner ring, an outer ring, a bridge, an open first channel and an open second channel. The inner ring radially engages the bearing. The outer ring radially engages the stationary structure. The bridge projects radially out from the inner ring to the outer ring. The bridge extends circumferentially about the inner ring. The open first channel extends axially into the flexible support from a first side of the flexible support to the bridge. The open second channel extends axially into the flexible support from a second side of the flexible support to the bridge.

17 Claims, 7 Drawing Sheets

(56) References Cited

U.S. PATENT DOCUMENTS

| | | | |
|---|---|---|---|
| 2012/0213629 A1* | 8/2012 | Rouesne | F16C 27/045 |
| | | | 415/170.1 |
| 2017/0145855 A1* | 5/2017 | Ganiger | F16C 35/067 |
| 2017/0276173 A1* | 9/2017 | Smedresman | F16F 15/022 |
| 2021/0040865 A1* | 2/2021 | Ganiger | F01D 25/18 |

* cited by examiner

FLEXIBLE SUPPORT FOR AIRCRAFT MOTOR BEARING

TECHNICAL FIELD

This disclosure relates generally to an aircraft motor and, more particularly, to a bearing support member for use within the aircraft motor.

BACKGROUND INFORMATION

An aircraft motor such as a gas turbine engine or electric motor may include a flexible bearing support to accommodate slight radial shifts between a rotating structure and a stationary structure of the aircraft motor. Various types and configurations of flexible bearing supports are known in the art. While these known flexible bearing supports have various benefits, there is still room in the art for improvement.

SUMMARY

According to an aspect of the present disclosure, an assembly is provided for an aircraft motor. The assembly includes a bearing, a stationary structure and a flexible support. The bearing extends circumferentially around an axis. The stationary structure circumscribes the bearing. The flexible support is arranged radially between the bearing and the stationary structure. The flexible support includes an inner ring, an outer ring, a bridge, an open first channel and an open second channel. The inner ring radially engages the bearing. The outer ring radially engages the stationary structure. The bridge projects radially out from the inner ring to the outer ring. The bridge extends circumferentially about the inner ring. The open first channel extends axially into the flexible support from a first side of the flexible support to the bridge. The open second channel extends axially into the flexible support from a second side of the flexible support to the bridge.

According to another aspect of the present disclosure, an apparatus is provided for an aircraft motor. The apparatus includes a flexible support for a bearing in the aircraft motor. The flexible support extends axially along an axis between a support first side and a support second side. The flexible support includes an inner ring, an outer ring, a bridge, a first channel and a second channel. The inner ring extends axially along and circumferentially around the axis. The outer ring extends axially along and circumferentially around the axis. A groove projects radially into the outer ring towards the bridge. The groove extends axially within the outer ring with an axial width greater than an axial thickness of the bridge. The groove extends circumferentially around the axis within the outer ring. The bridge extends radially between and is formed integral with the inner ring and the outer ring. The bridge extends circumferentially about the inner ring. The first channel projects axially into the flexible support from the support first side to the bridge. The first channel extends circumferentially around the axis within the flexible support. The second channel projects axially into the flexible support from the support second side to the bridge. The second channel extends circumferentially around the axis within the flexible support.

According to still another aspect of the present disclosure, another apparatus is provided for an aircraft motor. The apparatus includes a flexible support for a bearing in the aircraft motor. The flexible support extends axially along an axis between a support first side and a support second side. The flexible support extends radially between a support inner side and a support outer side. The flexible support includes an inner ring, an outer ring, a bridge, an annular first channel and an annular second channel. The inner ring extends axially along and circumferentially around the axis. The inner ring is disposed at the support inner side. The outer ring extends axially along and circumferentially around the axis. The outer ring is disposed at the support outer side. The bridge projects radially out from the inner ring to the outer ring. The bridge extends circumferentially about the axis. A radial height of the bridge is greater than an axial thickness of the bridge. The axial thickness of the bridge is greater than a radial thickness of the inner ring and/or a radial thickness of the outer ring. The annular first channel projects axially into the flexible support from the support first side to the bridge. The annular second channel projects axially into the flexible support from the support second side to the bridge.

An undercut may project radially into the outer ring from the groove. The undercut may extend axially within the outer ring. The undercut may extend circumferentially around the axis within the outer ring.

The bearing may be configured as or otherwise include a rolling element bearing with an outer race. The inner ring may circumscribe and radially engage the outer race.

The inner ring may circumscribe and radially contact the bearing.

The assembly may also include a fluid source fluidly coupled with a fluid passage that extends radially through the flexible support. The fluid source may be configured to direct fluid through the fluid passage to provide a fluid buffer radially between the inner ring and the bearing.

The stationary structure may circumscribe and radially contact the outer ring.

A groove may project radially into the outer ring towards the bridge. The groove may extend axially within the outer ring. The groove may extend circumferentially about the axis within the outer ring.

The groove may have an axial width that is greater than an axial thickness of the bridge.

The groove may have a radial depth that is less than a radial height of the bridge.

The flexible support may be attached to the stationary structure through an interference fit at a radial interface between the outer ring and the stationary structure.

The flexible support may be attached to the stationary structure through a bonded connection between the outer ring and the stationary structure.

The flexible support may be attached to the stationary structure with one or more fasteners.

The bridge may circumscribe the inner ring.

The bridge may be a first bridge. The flexible support may also include a second bridge. The second bridge may project radially out from the inner ring to the outer ring. The second bridge may extend circumferentially about the axis. The second bridge may be circumferentially spaced from the first bridge by a gap.

A radial height of the bridge may be greater than an axial thickness of the bridge.

The bridge may be axially aligned with an axial center of the bearing.

The bearing may include a plurality of rolling elements arranged circumferentially about the axis in an array. The bridge may axially overlap the array of the rolling elements.

The outer ring may include a fuse axially spaced from the bridge.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
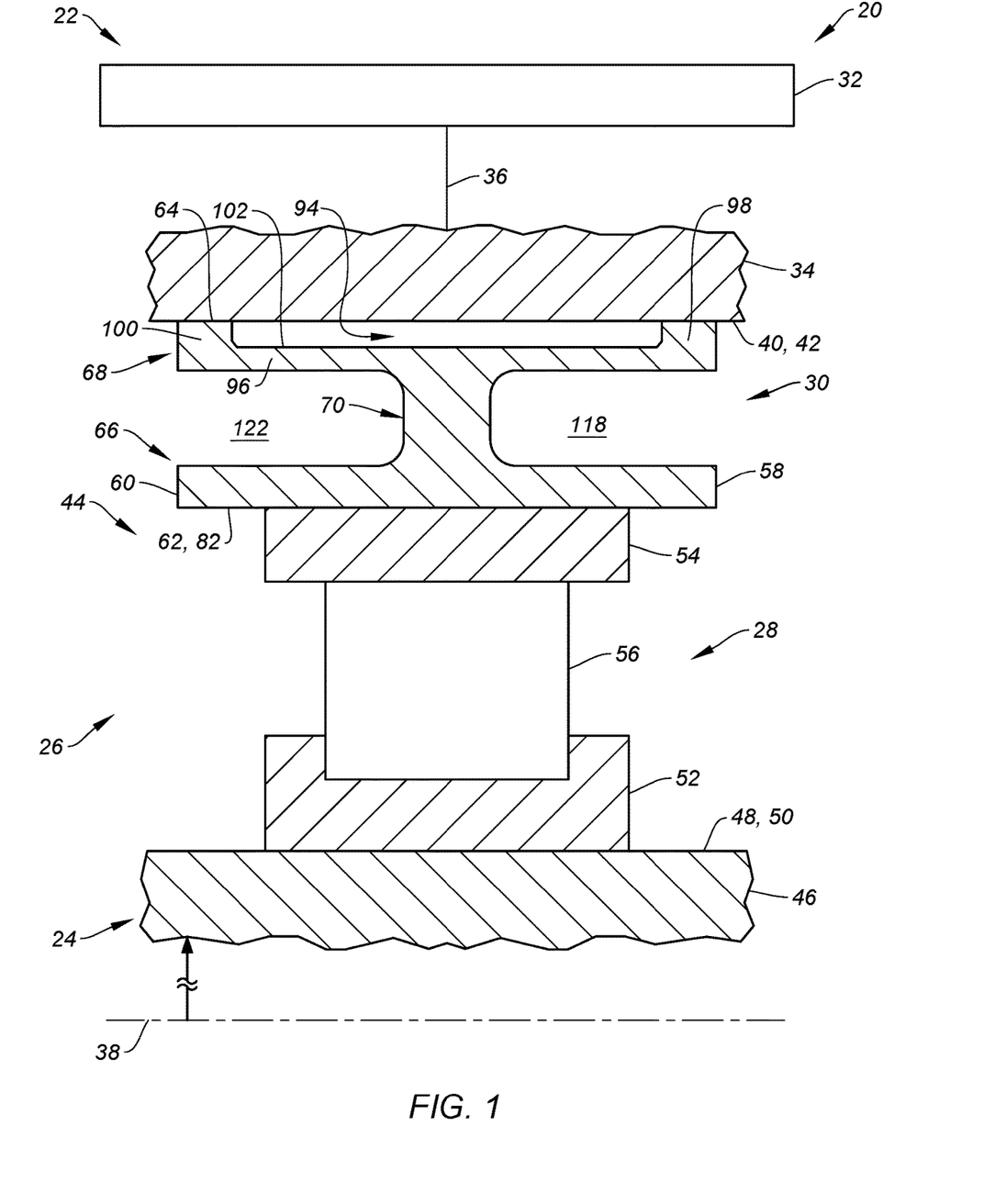
FIG. 1 is a sectional illustration of a portion of an assembly for an aircraft motor.

FIG. 1 illustrates an assembly 20 for an engine of an aircraft. The aircraft may be an airplane, a helicopter, a drone (e.g., an unmanned aerial vehicle (UAV)) or any other manned or unmanned aerial vehicle or system. The aircraft motor may be configured as, or otherwise included as part of, a propulsion system for the aircraft. The aircraft motor may also or alternatively be configured as, or otherwise included as part of, an electrical power system for the aircraft. The engine assembly 20 of FIG. 1 includes a stationary structure 22 of the aircraft motor and a rotating structure 24 of the aircraft motor. This engine assembly 20 also includes a mounting assembly 26 for rotatably mounting the rotating structure 24 to the stationary structure 22. The mounting assembly 26 of FIG. 1 includes a bearing 28 and a flexible support 30 for the bearing 28; e.g., a flexible bearing support.

The stationary structure 22 may be configured as, or otherwise included as part of, a casing structure of the aircraft motor. The stationary structure 22 of FIG. 1, for example, includes an engine case 32, a stationary outer mounting land 34 and a land support 36 (e.g., an annular frame, an array of struts, etc.) extending radially between and structurally tying the outer mounting land 34 to the engine case 32, where the engine case 32 and the land support 36 are schematically shown. The outer mounting land 34 extends axially along an axis 38. Briefly, this axis 38 may be a centerline axis of the aircraft motor and/or one or more of its members 22, 24, 26, 28 and/or 30. The axis 38 may also or alternatively be a rotational axis of the rotating structure 24. The outer mounting land 34 projects radially inward (towards the axis 38) to a radial inner side 40 of the outer mounting land 34. The outer mounting land 34 extends circumferentially about (e.g., completely around) the axis 38, which provides the outer mounting land 34 with, for example, a full-hoop (e.g., tubular or annular) geometry.

The outer mounting land 34 of FIG. 1 includes an interior land surface 42 disposed at the land inner side 40. This interior land surface 42 may have a regular cylindrical geometry. The land inner side 40 and its interior land surface 42 partially or completely form a radial outer peripheral boundary of an internal bore 44 in the stationary structure 22 and its outer mounting land 34. This land bore 44 extends axially along the axis 38 in (e.g., into, within or through) the stationary structure 22 and its outer mounting land 34.

The rotating structure 24 may be configured as, other otherwise included as part of, a spool or other rotating assembly of the aircraft motor. The rotating structure 24 of FIG. 1, for example, includes an inner mounting land 46 extending axially in the land bore 44. This inner mounting land 46 may be part (e.g., an axial section) of an engine shaft. The inner mounting land 46 may alternatively be configured as, or otherwise included as part of, another component mounted onto or formed integral with the engine shaft; e.g., a shaft sleeve, a rotor disk, etc. The inner mounting land 46 extends axially along the axis 38. The inner mounting land 46 projects radially outward (away from the axis 38) to a radial outer side 48 of the inner mounting land 46. The inner mounting land 46 extends circumferentially about (e.g., completely around) the axis 38, which provides the inner mounting land 46 with, for example, a full-hoop (e.g., tubular or annular) geometry.

The inner mounting land 46 of FIG. 1 includes an exterior land surface 50 disposed at the land outer side 48. The exterior land surface 50 may have a regular cylindrical geometry.

The bearing 28 may be configured as a rolling element bearing. The bearing 28 of FIG. 1, for example, includes a bearing inner race 52, a bearing outer race 54 and a plurality of bearing rolling elements 56 arranged circumferentially about the axis 38 in an array; e.g., a circular array. The inner race 52 extends axially along and circumferentially about (e.g., circumscribes) the inner mounting land 46 and the axis 38. This inner race 52 is mounted onto (e.g., fixed to) and is rotatable with the rotating structure 24 and its inner mounting land 46. The outer race 54 is spaced radially outboard from the inner race 52. The outer race 54 extends axially along and circumferentially about (e.g., circumscribes) the inner race 52, the array of rolling elements 56 and the axis 38. The array of rolling elements 56 are arranged radially between the inner race 52 and the outer race 54, where each of the rolling elements 56 is operable to radially engage and roll against the inner race 52 and the outer race 54. The present disclosure, however, is not limited to such an exemplary rolling element bearing configuration. Moreover, while the bearing 28 is described above as the rolling element bearing, it is contemplated the bearing 28 may alternatively be configured as a journal bearing or any other type of bearing suitable for use in the aircraft motor.

Figure 2:
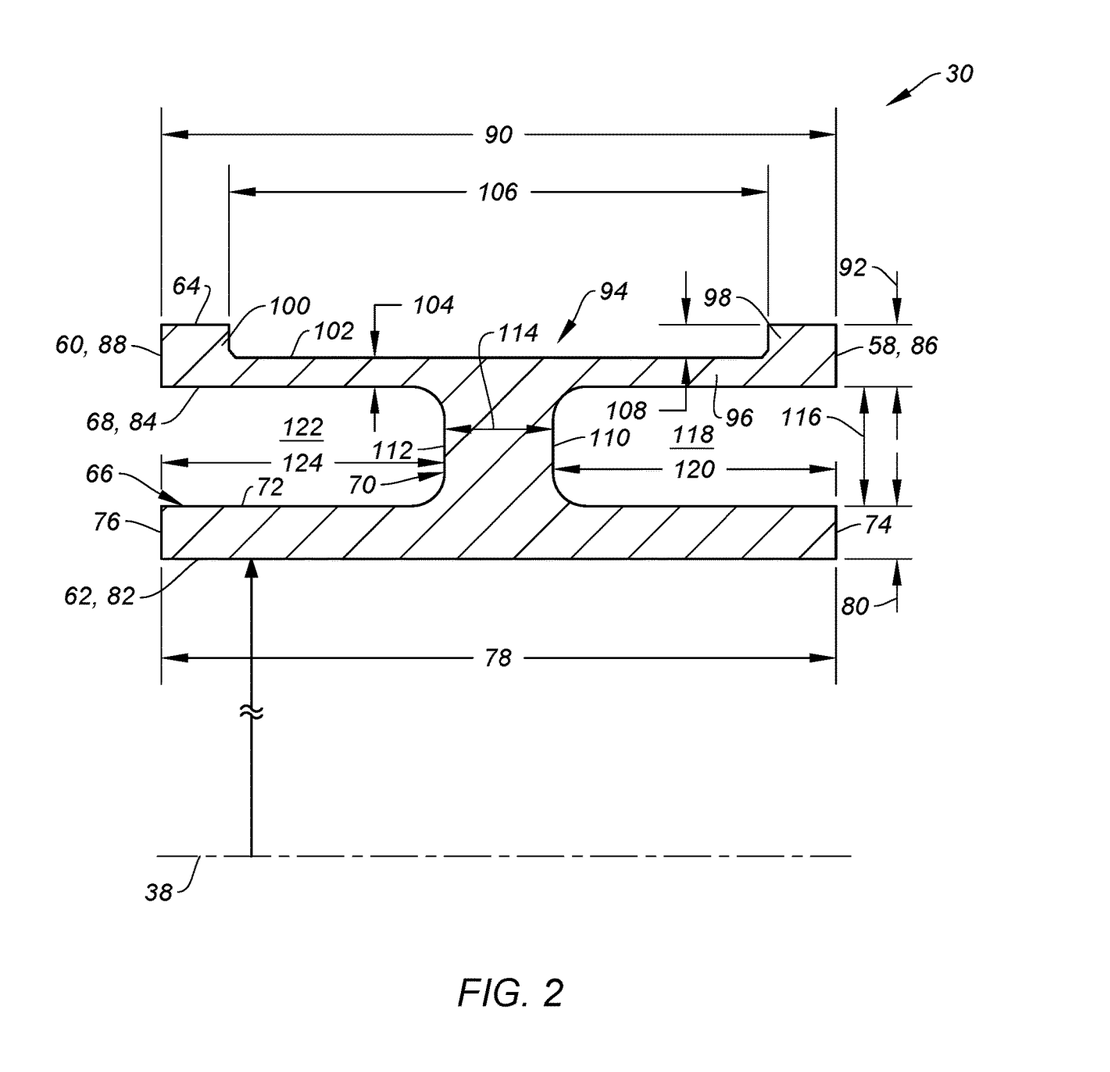
FIG. 2 is a sectional illustration of a portion of a flexible support.

Referring to FIG. 2, the flexible support 30 extends axially along the axis 38 between and to a first side 58 of the flexible support 30 and a second side 60 of the flexible support 30. The flexible support 30 extends radially from a radial inner side 62 of the flexible support 30 to a radial outer side 64 of the flexible support 30. The flexible support 30 of FIG. 3 extends circumferentially about (e.g., completely around) the axis 38, which provides the flexible support 30 with, for example, a full-hoop (e.g., annular) geometry. Referring to FIG. 2, the flexible support 30 may be configured with an I-beam cross-sectional geometry when viewed, for example, in a reference plane parallel with (e.g., including) the axis 38. The flexible support 30 of FIG. 2, for example, includes a radial inner ring 66, a radial outer ring 68 and an intermediate bridge 70.

The support inner ring 66 is disposed at the support inner side 62. The support inner ring 66 of FIG. 2, for example, extends radially between and to a radial outer side 72 of the support inner ring 66 and the support inner side 62. The support inner ring 66 extends axially along the axis 38 between and to opposing axial sides 74 and 76 of the support inner ring 66. The inner ring first side 74 may be disposed at (or axially recessed from) the support first side 58. The inner ring second side 76 may be disposed at (or axially recessed from) the support second side 60. The support inner ring 66 of FIG. 3 extends circumferentially about (e.g., completely around) the axis 38, which provides the support inner ring 66 with, for example, a full-hoop (e.g., tubular) geometry. With this arrangement, the support inner ring 66 of FIG. 2 may form an inner flange of the I-beam cross-sectional geometry.

The support inner ring 66 has an axial width 78 and a radial thickness 80. The inner ring width 78 is measured axially along the axis 38 from the inner ring first side 74 to the inner ring second side 76. This inner ring width 78 may be uniform (constant) as the support inner ring 66 extends circumferentially about the axis 38. The inner ring thickness 80 is measured radially from the support inner side 62 to the inner ring outer side 72. This inner ring thickness 80 may be uniform as the support inner ring 66 extends circumferentially about the axis 38.

The flexible support 30 and its support inner ring 66 of FIG. 2 include an interior support surface 82 disposed at the support inner side 62. The interior support surface 82 may have a regular cylindrical geometry which extends axially from (or near) the inner ring first side 74 to (or near) the inner ring second side 76.

The support outer ring 68 is disposed at the support outer side 64. The support outer ring 68 of FIG. 2, for example, extends radially between and to a radial inner side 84 of the support outer ring 68 and the support outer side 64. The support outer ring 68 extends axially along the axis 38 between and to opposing axial sides 86 and 88 of the support outer ring 68. The outer ring first side 86 may be disposed at (or axially recessed from) the support first side 58 and/or axially aligned with the inner ring first side 74. The outer ring second side 88 may be disposed at (or axially recessed from) the support second side 60 and/or axially aligned with the inner ring second side 76. The support outer ring 68 of FIG. 3 extends circumferentially about (e.g., completely around) the axis 38, which provides the support outer ring 68 with, for example, a full-hoop (e.g., tubular) geometry. With this arrangement, the support outer ring 68 of FIG. 2 may form an outer flange of the I-beam cross-sectional geometry.

Figure 5:
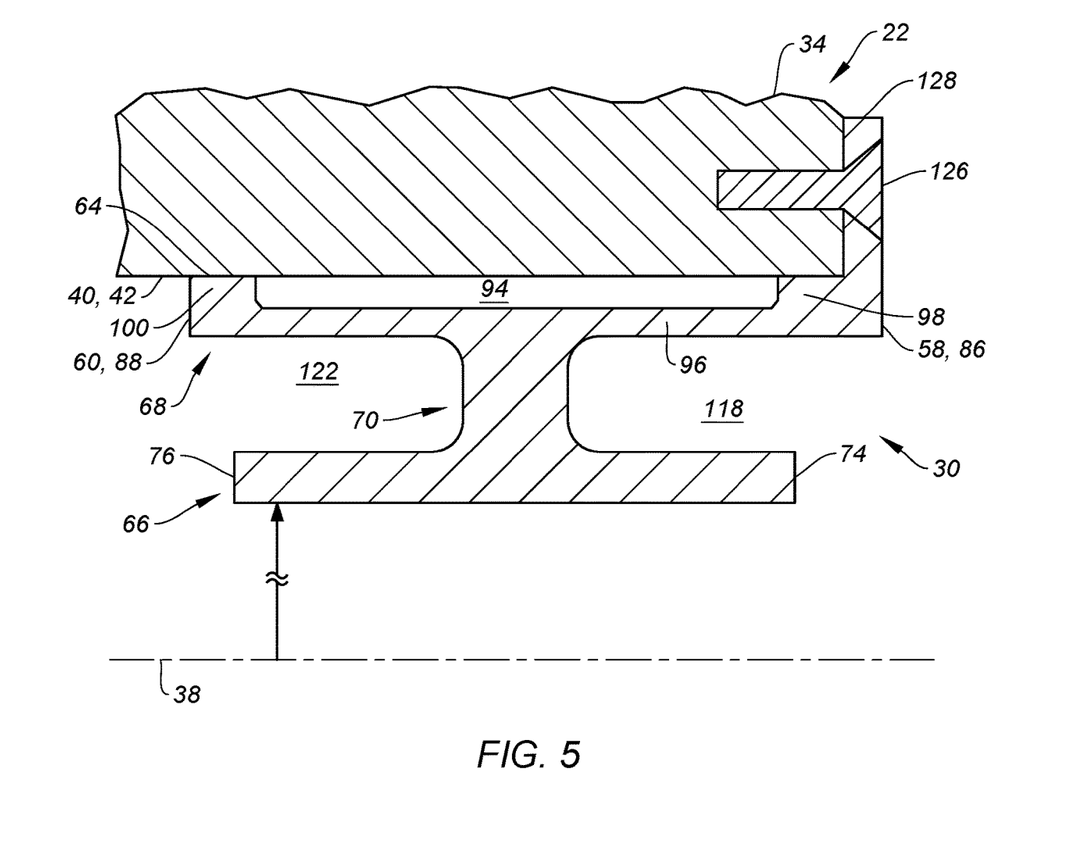
FIG. 5 is a sectional illustration of a portion of the assembly with another flexible support mounting arrangement.

The support outer ring 68 has an axial width 90 and a radial thickness 92. The outer ring width 90 is measured axially along the axis 38 from the outer ring first side 86 to the outer ring second side 88. This outer ring width 90 may be uniform as the support outer ring 68 extends circumferentially about the axis 38. The outer ring width 90 of FIG. 2 is equal to the inner ring width 78; however, it is contemplated the outer ring width 90 may alternatively be different (e.g., greater) than the inner ring width 78 (e.g., see FIG. 5). The outer ring thickness 92 is measured radially from the support outer side 64 to the outer ring inner side 84. This outer ring thickness 92 may be uniform as the support outer ring 68 extends circumferentially about the axis 38. The outer ring thickness 92 of FIG. 2 is equal to the inner ring thickness 80; however, it is contemplated the outer ring thickness 92 may alternatively be different (e.g., greater or less) than the inner ring thickness 80.

The support outer ring 68 of FIG. 2 is configured with a groove 94 at the support outer side 64. The support outer ring 68 of FIG. 2, for example, includes a base 96 and one or more feet 98 and 100; e.g., ribs, rims, flanges, etc. The outer ring base 96 extends axially along the axis 38 from the outer ring first side 86 to the outer ring second side 88. The outer ring base 96 is disposed at the outer ring inner side 84. The outer ring base 96 of FIG. 2, for example, extends radially from an outer side 102 of the outer ring base 96 (e.g., a distal inner side of the groove 94) to the outer ring inner side 84. The outer ring feet 98 and 100 are disposed at the opposing sides 86 and 88 of the support outer ring 68 and are connected to (e.g., formed integral with) the outer ring base 96. Each of the outer ring feet 98 and 100 projects radially out from the outer ring base 96 to the support outer side 64. Each of the outer ring members 96, 98, 100 may extend circumferentially about (e.g., completely around) the axis 38. With this arrangement, the groove 94 projects partially radially into the support outer ring 68 from the support outer side 64 to the outer ring base outer side 102. The groove 94 extends axially along the axis 38 within the support outer ring 68 between the outer ring feet 98 and 100. The groove 94 extends circumferentially about (e.g., completely around) the axis 38 within the support outer ring 68.

The outer ring base 96 has a radial thickness 104 measured radially from the outer ring inner side 84 to the outer ring base outer side 102. This outer ring base thickness 104 may be uniform as the outer ring base 96 extends circumferentially about the axis 38. The base thickness 104 of FIG. 2 is different (e.g., less) than the inner ring thickness 80; however, it is contemplated the outer ring base thickness 104 may alternatively be equal to the inner ring thickness 80.

The groove 94 has an axial width 106 and a radial depth 108. The groove width 106 is measured axially along the axis 38 from the first outer ring foot 98 to the second outer ring foot 100. This groove width 106 may be uniform as the groove 94 extends circumferentially about the axis 38. The groove width 106 of FIG. 2 is less than (e.g., between 50% and 90% of) the outer ring width 90. The groove depth 108 is measured radially from the support outer side 64 to the outer ring base outer side 102. This groove depth 108 may be uniform as the groove 94 extends circumferentially about the axis 38. The groove depth 108 of FIG. 2 is equal to the outer ring base thickness 104; however, it is contemplated the groove depth 108 may alternatively be different (e.g., greater or less) than the outer ring base thickness 104.

The support bridge 70 is disposed radially between and connected to (e.g., formed integral with) the support inner ring 66 and the support outer ring 68 and its outer ring base 96. The support bridge 70 of FIG. 2, for example, projects radially out from the support inner ring 66 at its inner ring outer side 72 to the support outer ring 68 at its outer ring inner side 84. The support bridge 70 extends axially along the axis 38 between and to opposing axial sides 110 and 112 of the support bridge 70. The bridge first side 110 is axially recessed from each of the first sides 58, 74, 86. The bridge second side 112 is axially recessed from each of the second sides 60, 76, 88. The support bridge 70 of FIG. 2, for example, is axially centered along the support inner ring 66 and/or the support outer ring 68; e.g., axially centered between the support sides 58 and 60. The support bridge 70 of FIG. 3 extends circumferentially about (e.g., completely around) the axis 38, which provides the support bridge 70 with, for example, a full-hoop (e.g., annular) geometry. With this arrangement, the support bridge 70 of FIG. 2 may form a web of the I-beam cross-sectional geometry.

The support bridge 70 has an axial thickness 114 and a radial height 116. The bridge thickness 114 is measured axially along the axis 38 from the bridge first side 110 to the bridge second side 112. This bridge thickness 114 may be uniform as the support bridge 70 extends circumferentially about the axis 38. The bridge thickness 114 of FIG. 2 is less than the inner ring width 78, the outer ring width 90, the groove width 106 and/or the bridge height 116. The bridge thickness 114 of FIG. 2, however, is greater than the inner ring thickness 80, the outer ring thickness 92, the outer ring base thickness 104 and/or the groove depth 108. The bridge height 116 is measured radially from the support inner ring 66 at its inner ring outer side 72 to the support outer ring 68 at its outer ring inner side 84. This bridge height 116 may be uniform as the support bridge 70 extends circumferentially about the axis 38. The bridge height 116 of FIG. 2 is greater than the inner ring thickness 80, the outer ring thickness 92, the outer ring base thickness 104 and/or the groove depth 108. The bridge height 116 of FIG. 2, however, is less than inner ring width 78, the outer ring width 90 and/or the groove width 106. The present disclosure, however, is not limited to each of the foregoing exemplary dimensional relationships.

At least (or only) the support inner ring 66, the support outer ring 68 and the support bridge 70 of FIG. 2 collectively form a first channel 118 in the flexible support 30. The first channel 118 may be an open channel (e.g., an unfilled channel) in the flexible support 30. The first channel 118 is disposed at the support first side 58. The first channel 118 of FIG. 2, for example, projects axially along the axis 38 into the flexible support 30 from the support first side 58 to the support bridge 70 at its bridge first side 110. The first channel 118 extends radially within the flexible support 30 from the support inner ring 66 at its inner ring outer side 72 to the support outer ring 68 at its outer ring inner side 84. The first channel 118 extends circumferentially about (e.g., completely around) the axis 38, which provides the first channel 118 with, for example, a full-hoop (e.g., annular) geometry.

The first channel 118 has an axial depth 120 measured from the support first side 58 to the bridge first side 110. This first channel depth 120 may be uniform as the first channel 118 extends circumferentially about the axis 38. The first channel depth 120 of FIG. 2 is greater than the bridge thickness 114 and/or the bridge height 116.

At least (or only) the support inner ring 66, the support outer ring 68 and the support bridge 70 of FIG. 2 collectively form a second channel 122 in the flexible support 30. The second channel 122 may be an open channel (e.g., an unfilled channel) in the flexible support 30. The second channel 122 is disposed at the support second side 60. The second channel 122 of FIG. 2, for example, projects axially along the axis 38 into the flexible support 30 from the support second side 60 to the support bridge 70 at its bridge second side 112. The second channel 122 extends radially within the flexible support 30 from the support inner ring 66 at its inner ring outer side 72 to the support outer ring 68 at its outer ring inner side 84. The second channel 122 extends circumferentially about (e.g., completely around) the axis 38, which provides the second channel 122 with, for example, a full-hoop (e.g., annular) geometry.

Figure 4:
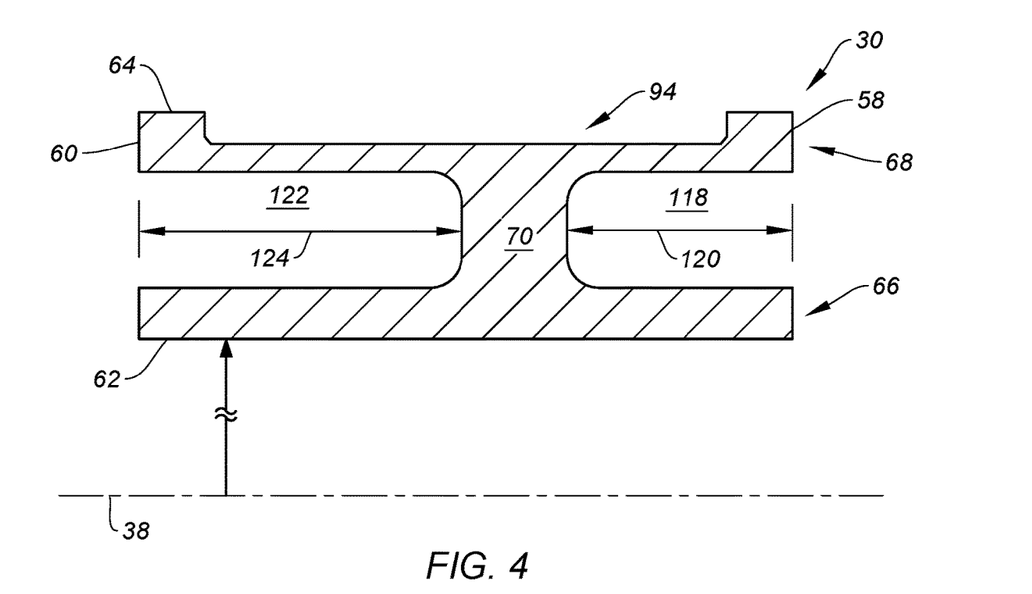
FIG. 4 is a sectional illustration of a portion of the flexible support with an offset bridge arrangement.

The second channel 122 has an axial depth 124 measured from the support second side 60 to the bridge second side 112. This second channel depth 124 may be uniform as the second channel 122 extends circumferentially about the axis 38. The second channel depth 124 of FIG. 2 is greater than the bridge thickness 114 and/or the bridge height 116. The second channel depth 124 of FIG. 2 is equal to the first channel depth 120; however, it is contemplated the second channel depth 124 may alternatively be different (e.g., greater or less) than the first channel depth 120; e.g., see FIG. 4 where the support bridge 70 is arranged off-center along the support inner ring 66 and/or the support outer ring 68.

Referring to FIG. 1, the flexible support 30 mounts (e.g., fixedly attaches) the bearing 28 and its outer race 54 to the stationary structure 22 and its outer mounting land 34. The support inner ring 66 of FIG. 1, for example, extends axially along (e.g., axially overlaps) and circumferentially around (e.g., circumscribes) the bearing 28 and its outer race 54. The support inner ring 66 and its surface 82 further radially engage (e.g., radially contact, abut radially against, etc.) the bearing 28 and its outer race 54. Here, the outer race 54 is attached to the support inner ring 66 by an interference fit at a radial interface between the outer race 54 and the support inner ring 66 at the support inner side 62. Similarly, the outer mounting land 34 extends axially along and circumferentially around the flexible support 30 and its support outer ring 68. The support outer ring 68 and its outer ring feet 98 and 100 further radially engage (e.g., radially contact, abut radially against, etc.) the stationary structure 22 and its outer mounting land 34. Here, the support outer ring 68 is attached to the outer mounting land 34 by an interference fit at a radial interface between the support outer ring 68 at its support outer side 64 and the outer mounting land 34 and its land inner side 40.

With the foregoing arrangement, the flexible support 30 is configured to accommodate (e.g., slight) radial movement between the rotating structure 24 and the stationary structure 22 during aircraft motor operation. The outer ring base 96 of FIG. 1, for example, may operate as a flexible member (e.g., a spring diagram, etc.) connecting the support bridge 70 to the outer ring feet 98 and 100. To facilitate a radial upward shift of the rotating structure 24 in FIG. 1, the outer ring base 96 may deform and bow radially outward into the groove 94/the groove depth 108 of FIG. 2 may locally decrease. To facilitate a radial downward shift of the rotating structure 24 in FIG. 1, the outer ring base 96 may deform and bow radially inward away from the groove 94/the groove depth 108 of FIG. 2 may locally increase. Of course, opposite deformation of the outer ring base 96 may occur at a diametrically opposing side of the flexible support 30 to the section shown in FIG. 1. Dimensions of the flexible support 30 may be selected to tune a spring rate of the outer ring base 96.

The support bridge 70 of FIG. 1 is axially aligned with a center of the bearing 28. The support bridge 70, however, may alternatively be axially offset from the center of the bearing 28. Even with such offset arrangements, however, the support bridge 70 may axially overlap the array of rolling elements 56.

While the flexible support 30 is described above as being attached to the bearing 28 and the stationary structure 22 through interference fits, the present disclosure is not limited to such exemplary mounting techniques. For example, the flexible support 30 and its support outer ring 68 may also or alternatively be bonded (e.g., welded, brazed, etc.) to the stationary structure 22 and its outer mounting land 34. In another example, referring to FIG. 5, the flexible support 30 may also or alternatively be mechanically fastened to the stationary structure 22 and its outer mounting land 34 by one or more mechanical fasteners 126; e.g., bolts. A mounting flange 128, for example, may be connected to and project radially out from the support outer ring 68 at the support first side 58/the outer ring first side 86. This mounting flange 128 may abut axially against or otherwise axially engage the stationary structure 22 and its outer mounting land 34. The mounting flange 128 is attached to the stationary structure 22 and its outer mounting land 34 by the mechanical fasteners 126.

Figure 3:
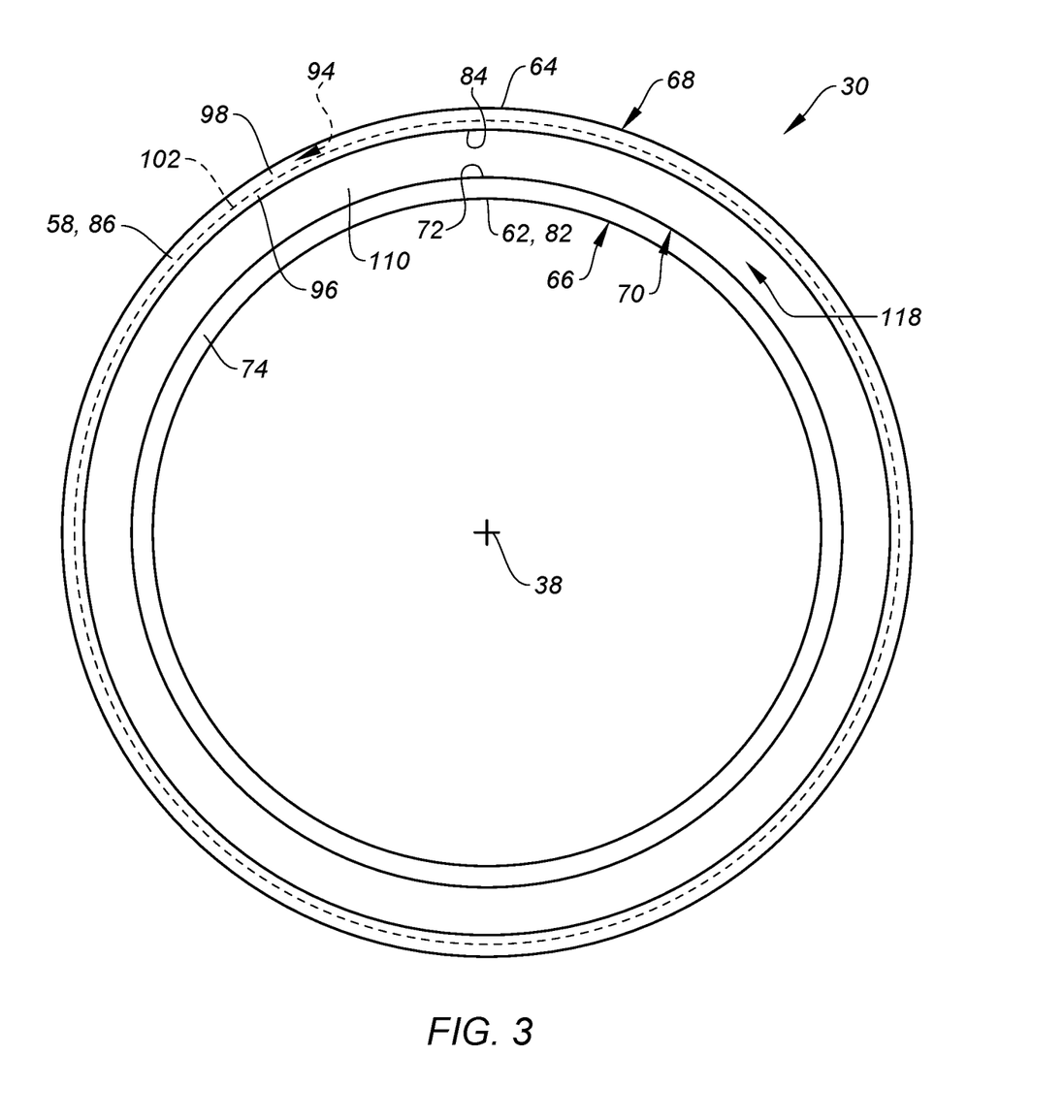
FIG. 3 is a side view illustration of the flexible support.
Figure 6:
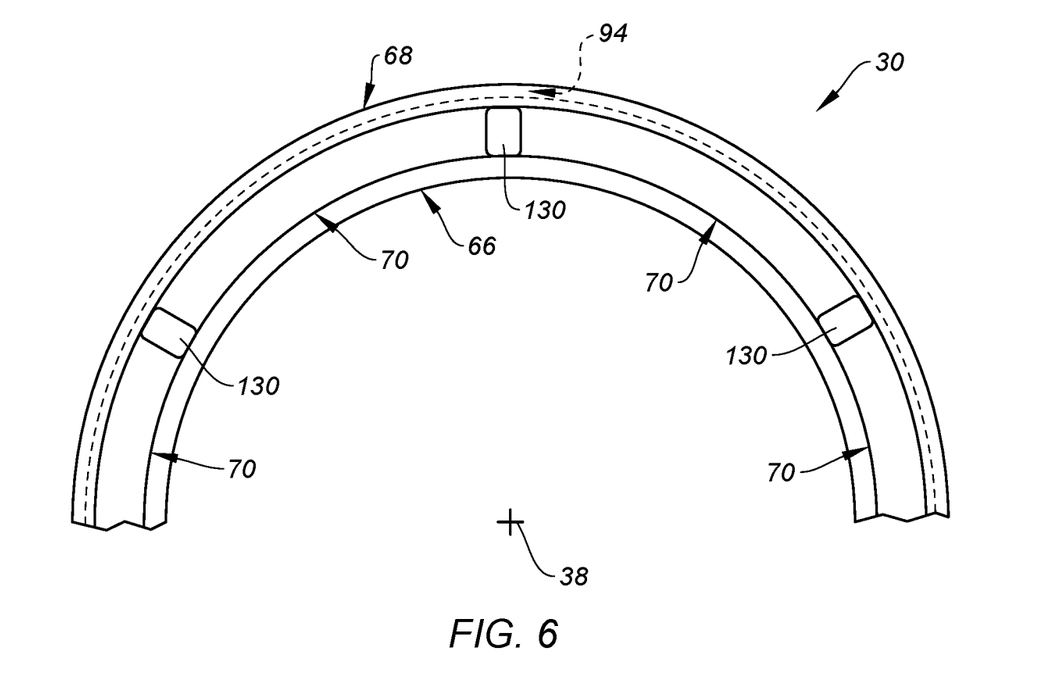
FIG. 6 is a side view illustration of a portion of the flexible support with multi-bridges.
Figure 7:
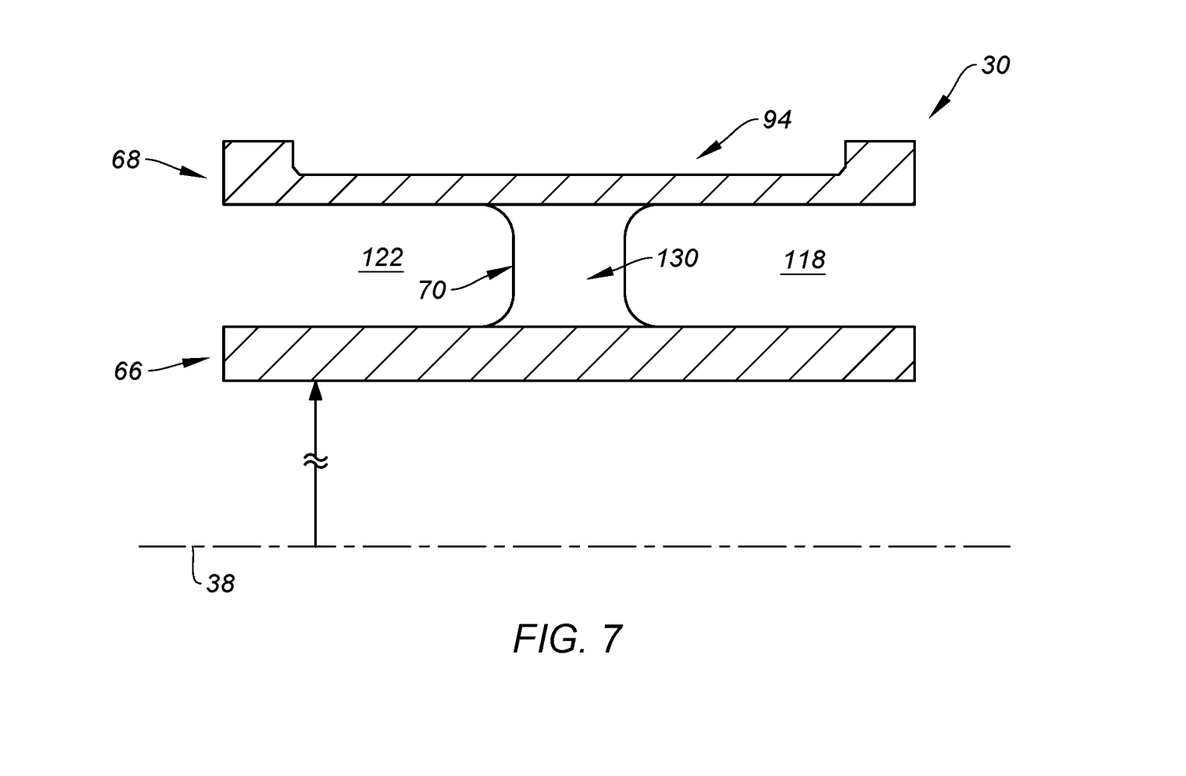
FIG. 7 is a sectional illustration of a portion of the flexible support of FIG. 6.

In some embodiments, referring to FIG. 3, the support bridge 70 may be configured as an annular element of the flexible support 30. In other embodiments, referring to FIG. 6, the support bridge 70 may be one of multiple support bridges 70 which extend radially between and connect the support inner ring 66 and the support outer ring 68. Here, each of the support bridges 70 extends partially circumferentially about the axis 38 configuring each support bridge 70 as an arcuate element of the flexible support 30. These support bridges 70 of FIG. 6 are arranged (e.g., an equispaced) circumferentially about the axis 38 in an array and form a plurality of ports 130; e.g., air gaps. Each port 130 of FIG. 6 is formed by and extends laterally (e.g., circumferentially) between a respective circumferentially neighboring (e.g., adjacent) pair of the support bridges 70. Referring to FIG. 7, each port 130 extends axially along the axis 38 between and to the first channel 118 and the second channel 122; e.g., axially through the array of support bridges 70.

Figure 8:
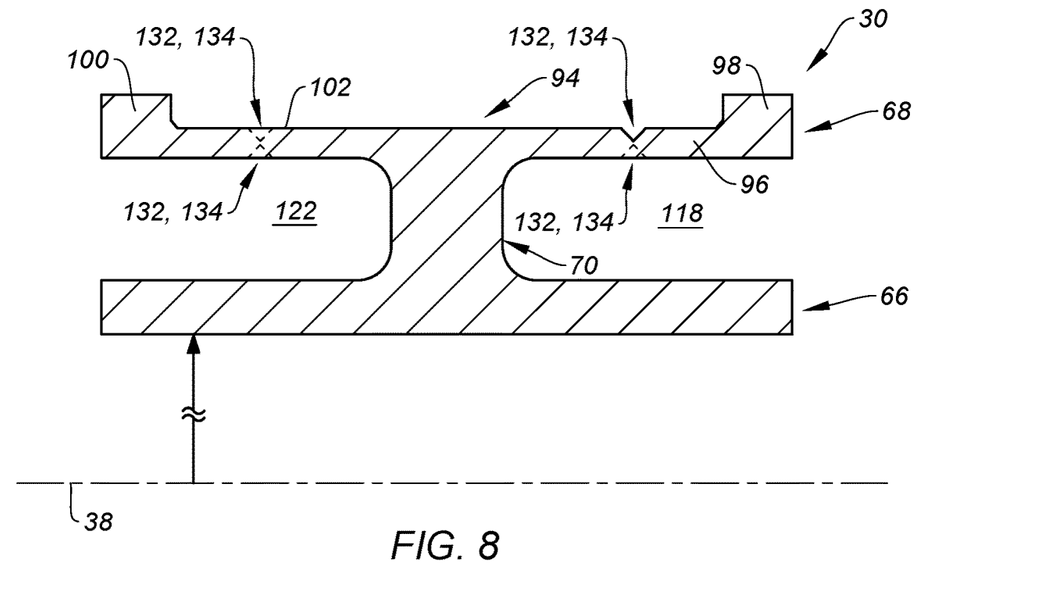
FIG. 8 is a sectional illustration of a portion of the flexible support with a fuse.

In some embodiments, referring to FIG. 8, the flexible support 30 may be configured with a fuse 132; e.g., a fracture feature. The support outer ring 68 of FIG. 8, for example, includes an undercut 134 (e.g., a notch, a groove, a channel, etc.) in the outer ring base 96. This undercut 134 projects partially radially into the outer ring base 96 from the groove 94 and the outer ring base outer side 102. The undercut 134 extends axially within the outer ring base 96. The undercut 134 extends circumferentially about (e.g., completely around) the axis 38 within the outer ring base 96. The undercut 134 may thereby form a stress point (e.g., a weak point) in the support outer ring 68 and its outer ring base 96. With this configuration, the support outer ring 68 may fracture when subject to relatively high (e.g., extreme) loading. This fracturing may facilitate further control radial movement (e.g., shifting) between the rotating structure 24 and the stationary structure 22. Moreover, the frangibility in the flexible support 30 may also cut a load path between the stationary structure 22 and rotating structure 24 (see FIG. 1). This may reduce vibration transmitted by the aircraft motor to the airframe in case of an engine event resulting in an unbalanced rotor; e.g., a blade off event. Note, while the fuse 132 is shown on a top-righthand side of the support bridges 70 in FIG. 8, it is contemplated the fuse 132 and its undercut 134 (see dashed lines) may alternatively (or also) be on a top-lefthand side, a bottom-righthand side and/or a bottom-lefthand side of the support bridges 70.

Figure 9:
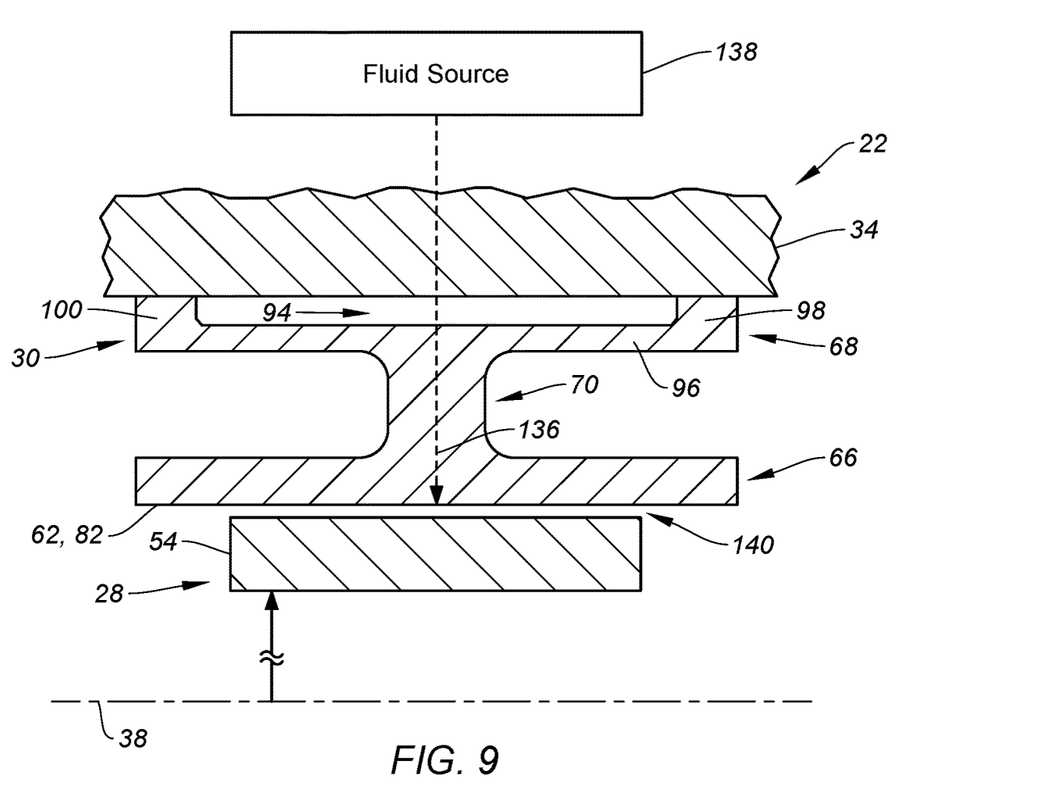
FIG. 9 is a sectional illustration of a portion of the assembly with a fluid system.

In some embodiments, referring to FIG. 9, the flexible support 30 may include one or more fluid passages 136 (e.g., lubricant passages) arranged circumferentially about the axis 38 in an array; e.g., a circular array. Each of these fluid passages 136 may project radially through the flexible support 30. Each fluid passage 136, for example, may extend (e.g., sequentially) radially through the support members 68, 70 and 68 from the groove 94 to the support inner side 62. The fluid passages 136 may be fluidly coupled with a fluid source 138; e.g., a lubricant source. With this arrangement, each fluid passage 136 may direct fluid (e.g., lubricant) received from the fluid source 138 into a gap 140 formed by and radially between the support inner ring 66 and the outer race 54. The fluid in the gap 140 may form a fluid buffer (e.g., a film, a cushion) radially between the support inner ring 66 and the outer race 54. The flexible support 30 and its support inner ring 66 may thereby be connected to and support the bearing 28 and its outer race 54 through a fluid damper.

Figure 10:
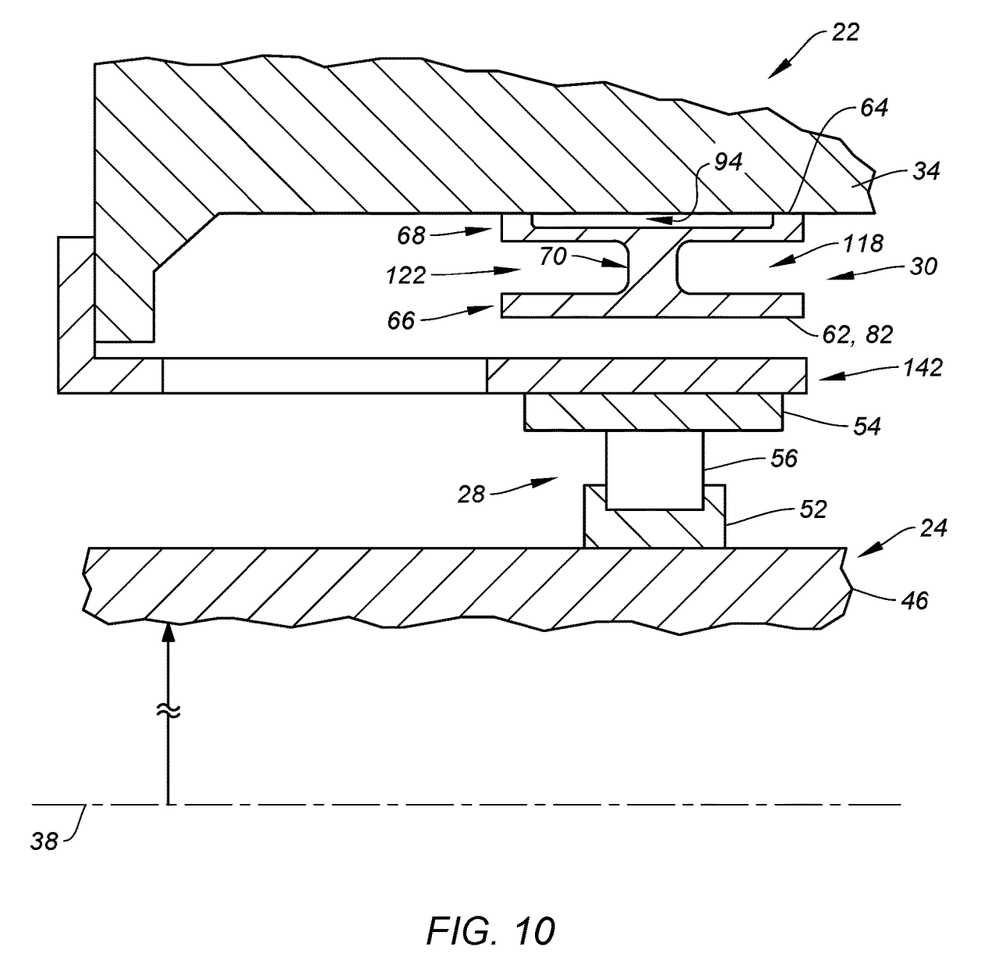
FIG. 10 is a sectional illustration of a portion of another assembly for the aircraft motor.

In some embodiments, referring to FIG. 1, the flexible support 30 may be configured as an insert radially between and mounting the bearing 28 and its outer race 54 to the stationary structure 22 and its outer mounting land 34. The flexible support 30 of the present disclosure, however, is not limited to such an exemplary flexible support configuration. For example, referring to FIG. 10, the flexible support 30 may alternatively be configured as a bump stop support for another flexible mount 142 for the bearing 28; e.g., a squirrel cage bearing mount. Here, the flexible support 30 and the flexible mount 142 are independently attached to the stationary structure 22. Moreover, the flexible support 30 is spaced radially outboard from, axially overlaps and circumscribes the flexible mount 142. With this arrangement, the flexible support 30 provides a progressive bump stop for the flexible mount 142 under certain conditions.

The aircraft motor of the present disclosure may be configured as or otherwise include a gas turbine engine. The gas turbine engine may be a geared gas turbine engine with a geartrain operatively coupling one or more shafts to one or more rotors in a fan section, a compressor section and/or any other engine section. Alternatively, the gas turbine engine may be configured without a geartrain as a direct-drive gas turbine engine. The gas turbine engine may include a single spool or multiple spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines. Moreover, while the aircraft motor is described above as a gas turbine engine, it is contemplated the aircraft motor may alternatively be configured as or otherwise include another type of internal combustion (IC) engine such as, but not limited to, a rotary engine (e.g., a Wankel type engine) or a reciprocating piston engine, or even an electric motor.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft motor, comprising:
   a bearing extending circumferentially around an axis;
   a stationary structure circumscribing the bearing; and
   a flexible support arranged radially between the bearing and the stationary structure, the flexible support including
   an inner ring radially engaging an outer surface of the bearing;
   an outer ring radially engaging the stationary structure;

a bridge projecting radially out from the inner ring to the outer ring, the bridge extending circumferentially about the inner ring;

an open first channel extending axially into the flexible support from a first side of the flexible support to the bridge; and an open second channel extending axially into the flexible support from a second side of the flexible support to the bridge;

wherein a continuous annular groove projects radially into the outer ring towards the bridge, the groove extends axially within the outer ring, and the groove extends circumferentially about the axis within the outer ring; and wherein the groove has an axial width that is greater than an axial thickness of the bridge.

2. The assembly of claim 1, wherein
the bearing comprises a rolling element bearing with an outer race; and
the inner ring circumscribes and radially engages the outer race.

3. The assembly of claim 1, wherein the inner ring circumscribes and radially contacts the bearing.

4. The assembly of claim 1, further comprising:
a fluid source fluidly coupled with a fluid passage that extends radially through the flexible support;
the fluid source configured to direct fluid through the fluid passage to provide a fluid buffer radially between the inner ring and the bearing.

5. The assembly of claim 1, wherein the stationary structure circumscribes and radially contacts the outer ring.

6. The assembly of claim 1, wherein the groove has a radial depth that is less than a radial height of the bridge.

7. The assembly of claim 1, wherein the flexible support is attached to the stationary structure through an interference fit at a radial interface between the outer ring and the stationary structure.

8. The assembly of claim 1, wherein the flexible support is attached to the stationary structure through a bonded connection between the outer ring and the stationary structure.

9. The assembly of claim 1, wherein the flexible support is attached to the stationary structure with one or more fasteners.

10. The assembly of claim 1, wherein the bridge circumscribes the inner ring.

11. The assembly of claim 1, wherein
the bridge is a first bridge, and the flexible support further includes a second bridge; and
the second bridge projects radially out from the inner ring to the outer ring, the second bridge extends circumferentially about the axis, and the second bridge is circumferentially spaced from the first bridge by a gap.

12. The assembly of claim 1, wherein a radial height of the bridge is greater than an axial thickness of the bridge.

13. The assembly of claim 1, wherein the bridge is axially aligned with an axial center of the bearing.

14. The assembly of claim 1, wherein
the bearing comprises a plurality of rolling elements arranged circumferentially about the axis in an array; and
the bridge axially overlaps the array of the plurality of rolling elements.

15. The assembly of claim 1, wherein the outer ring comprises a fuse axially spaced from the bridge.

16. The assembly of claim 1, wherein the bridge has an axial thickness that is greater than at least one of a radial thickness of the inner ring or a radial thickness of the outer ring.

17. An assembly for an aircraft motor, comprising:
a bearing extending circumferentially around an axis;
a stationary structure circumscribing the bearing; and
a flexible support arranged radially between the bearing and the stationary structure, the flexible support including an inner ring with an interior support surface radially engaging the bearing;
an outer ring radially engaging the stationary structure;
a bridge projecting radially out from the inner ring to the outer ring, the bridge extending circumferentially about the inner ring;
an open first channel extending axially into the flexible support from a first side of the flexible support to the bridge; and
an open second channel extending axially into the flexible support from a second side of the flexible support to the bridge;
wherein a continuous annular groove projects radially into the outer ring towards the bridge, the groove extends axially within the outer ring, and the groove extends circumferentially about the axis within the outer ring;
wherein the groove has an axial width that is greater than an axial thickness of the bridge; and
wherein the bridge has an axial thickness that is greater than at least one of a radial thickness of the inner ring or a radial thickness of the outer ring.

* * * * *